US012563075B1

(12) United States Patent
Jacquemin et al.

(10) Patent No.: US 12,563,075 B1
(45) Date of Patent: Feb. 24, 2026

(54) METHOD FOR AUTOMATED AND SECURE MANAGEMENT OF SOFTWARE ON A PLURALITY OF COMPUTER TERMINALS WITH REAL-TIME MONITORING AND NOTIFICATIONS

(71) Applicant: Beamy, Lille (FR)

(72) Inventors: Andréa Jacquemin, Lille (FR); Anne Gauthe, Lille (FR); Tahir Iftikhar, Lille (FR); Lucas Roveri, Lille (FR); Julien Emery, Lille (FR)

(73) Assignee: Beamy, Lille (FR)

( * ) Notice: Subject to any disclaimer, the term of this patent is extended or adjusted under 35 U.S.C. 154(b) by 0 days.

(21) Appl. No.: 19/088,017

(22) Filed: Mar. 24, 2025

(30) Foreign Application Priority Data

Dec. 16, 2024 (FR) ...................................... 2414188

(51) Int. Cl.
*H04L 9/40* (2022.01)
*H04L 67/1396* (2022.01)

(52) U.S. Cl.
CPC ...... *H04L 63/1425* (2013.01); *H04L 63/0428* (2013.01); *H04L 63/1433* (2013.01); *H04L 67/1396* (2022.05)

(58) Field of Classification Search
CPC ............. H04L 63/1425; H04L 63/0428; H04L 63/1433; H04L 67/1396
See application file for complete search history.

(56) References Cited

U.S. PATENT DOCUMENTS

| | | | | |
|---|---|---|---|---|
| 2020/0153920 A1* | 5/2020 | Chauhan | ................. | H04L 67/55 |
| 2020/0304462 A1* | 9/2020 | Kopp | ................... | H04L 63/0227 |
| 2021/0374755 A1* | 12/2021 | Manske | ............. | G06Q 20/4016 |
| 2023/0291743 A1* | 9/2023 | Shua | ...................... | H04L 63/102 |
| 2023/0344842 A1* | 10/2023 | Akhtar | ................ | H04L 63/1425 |
| 2025/0030717 A1* | 1/2025 | Nyamwange | ........ | H04L 63/1416 |
| 2025/0131093 A1* | 4/2025 | Sharieh | ................ | G06V 30/414 |

FOREIGN PATENT DOCUMENTS

| | | | | | |
|---|---|---|---|---|---|
| CN | 104580093 A | * | 4/2015 | ........... | G06F 3/0482 |
| CN | 116389155 A | * | 7/2023 | ......... | H04L 63/0428 |
| CN | 117880155 A | * | 4/2024 | | |
| DE | 202024104743 U1 | * | 8/2024 | ........... | G06F 21/554 |
| EP | 3327727 A2 | * | 5/2018 | ............. | G16H 50/20 |
| WO | WO-2024118245 A1 | * | 6/2024 | ........... | G06Q 10/103 |
| WO | WO-2024223873 A1 | * | 10/2024 | ............. | G06Q 50/01 |

* cited by examiner

*Primary Examiner* — Sarah Su
(74) *Attorney, Agent, or Firm* — TraskBritt

(57) ABSTRACT

A method for managing software on computer terminals (computers, mobiles, tablets) used by a community of an entity with security policies. Each terminal integrates a collection module that monitors user interactions with various applications in real-time. The process includes recording usage references, identifying applications used, and collecting associated data. This data is analyzed to identify applications in real-time and detect anomalies compared to normal usage. In case of abnormal behavior or to optimize the use of software, personalized notifications are generated in real-time. These notifications can be sent directly to terminals via email messages or integrated into the user interface. This process seeks to provide a centralized, pro-active, and automated governance to strengthen the compliance, security, and efficiency of applications used in an organization.

12 Claims, 2 Drawing Sheets

METHOD FOR AUTOMATED AND SECURE MANAGEMENT OF SOFTWARE ON A PLURALITY OF COMPUTER TERMINALS WITH REAL-TIME MONITORING AND NOTIFICATIONS

PRIORITY CLAIM

This application claims the benefit of the filing date of French Patent Application Serial No. FR2414188, filed Dec. 16, 2024, for "Method for Automated and Secure Management of Software on a Plurality of Computer Terminals With Real-Time Monitoring and Notifications," the entire disclosure of which is hereby incorporated herein in its entirety by this reference.

TECHNICAL FIELD

This present disclosure relates to the field of automating the management of software as a service (commonly known by its acronym "SaaS") in an IT environment with a large number of users with disparate and heterogeneous usage patterns.

BACKGROUND

Software as a service SaaS is a software distribution model where applications are accessed online, hosted in the cloud, and offered through a subscription. This model has become popular because of its flexibility, low costs, and universal accessibility. However, it also presents challenges in terms of security, internet dependency, and limited customization, which must be carefully managed by companies adopting this approach.

In 2023, the global SaaS market was valued at $273.55 billion. By 2032, the SaaS market could reach a valuation of 1,228.87 billion. The development of the SaaS market is being driven by the digital transformation of companies in their quest for operational efficiency, enhanced customer experience, innovation, and competitive differentiation without having to make massive investments in heavy, expensive infrastructures. The development of teleworking also contributes to the acceleration of the use of SaaS solutions.

The key applications of this model today are customer relationship management (CRM), e-commerce solutions, videoconferencing, human resources management, unified communications, messaging, and collaborative software, purchasing management, electronic document management (EDM), etc. SaaS allows companies to completely outsource an aspect of their information system (messaging, security, etc.) and treat it as an operating cost rather than an investment.

However, there is a wide range of SaaS solutions with identical or very similar functionalities, and each user will be tempted to use the SaaS he or she is familiar with, creating a strong disparity in structures with a large number of users.

The heterogeneous use of SaaS by different users within the same company can lead to several major drawbacks that affect both management, security, and the overall efficiency of the organization.

If each department or user adopts SaaS solutions without centralized coordination, there is a risk of using multiple applications that offer similar functionality (e.g., multiple project management, communication or CRM tools). This leads to application redundancy, increasing costs, and complicating management. The heterogeneity of SaaS also makes it difficult to track used licenses, which can result in payments for unused or underutilized subscriptions. This can also cause problems when it comes to negotiating group rates with suppliers.

When each user or department adopts their own SaaS solutions, it becomes difficult for IT teams to centralize application management. This leads to poor visibility into what applications are being used, how many licenses are required, and who has access to them. Especially since each SaaS has its own contractual terms, payment methods, and billing cycle. Heterogeneous use can lead to a multiplication of contracts to manage, making negotiation and management of renewals much more complex.

"Anarchic" use also leads to the use of applications not validated by IT: if users adopt SaaS without going through IT or corporate compliance, some of these applications may not comply with internal security policies. This includes weaknesses in authentication systems, lack of encryption, or questionable data protection practices. IT cannot monitor, secure, or manage applications that are not officially recognized. This exposes the company to risks of malware infiltration, data leaks, or compliance violations. And it is known that even a minor flaw can jeopardize the entire IT security.

Additionally, using SaaS that does not comply with regulations (e.g., GDPR, HIPAA) can expose the company to legal penalties or fines, especially if sensitive data is processed or stored on non-compliant platforms. These risks are increasing with the development of artificial intelligence.

Other operational issues arise from heterogeneous use of SaaS. They may not integrate easily with each other, making collaboration between departments difficult. For example, if one team uses a SaaS project management tool while another uses a different software, it can be difficult to synchronize information or facilitate data exchange. Uncoordinated adoption of SaaS leads to data being scattered across multiple systems. This fragmentation makes it difficult to create a unified view of information, limiting the ability to analyze data holistically or make decisions based on clear insights.

Finally, since each SaaS has its own interfaces, workflows, and functionalities, users must adapt to multiple environments. This can lead to lost productivity as employees spend time learning and juggling different tools. Using different applications for similar tasks can lead to inconsistency in internal processes. For example, two departments that use different tools to manage customer relationships might have different approaches, making it difficult to standardize procedures and results. If multiple SaaS are used in the company, the IT team must provide technical support for each tool, which complicates their work and dilutes their efforts. Each SaaS vendor may have their own support requirements, increasing issue resolution times.

In conclusion, heterogeneous use of SaaS by different users within an enterprise can generate several major drawbacks, including inefficient resource management, increased security risks, data fragmentation, and loss of operational efficiency. To overcome these challenges, it is crucial that enterprises implement SaaS governance strategies, centralize application management, and establish strict IT policies to govern the adoption and usage of SaaS services. This ensures better consistency, more security, and cost optimization.

To effectively manage SaaS applications used by a large number of users in a company, and avoid excessive heterogeneity, it is common practice to set up centralized governance and clear management processes. This includes selecting, adopting, licensing, and securing SaaS applications.

However, this requires significant human resources to support all users "in real-time," before they start using non-compliant applications, and can create excessive rigidity in the structure's operation, as the processes of requesting authorization, verification, justification, etc. can become prohibitive in relation to the responsiveness expected by operational staff. Technocratic centralization generally proves to be inappropriate and costly and leads users to bypass internal policies so as not to be slowed down in their activities.

It therefore appeared necessary to automate part of the management of Saas usage.

In the prior art, patent application WO2024118245 is known, which describes a process implemented in a Software as a Service (SaaS) management platform (SMP). The SMP is implemented in a cloud resource comprising at least one processor and at least one storage device. The process comprises the following steps:

- receiving, over a network, human resources (HR) data from an HR application, the HR data describing an organizational chart of the employees of the SMP client;
- identifying a plurality of SaaS applications used by the SMP client;
- receiving, over the network, a request from a client device associated with a given client employee and responding to the request, and then identifying a management group within the organizational chart of which the given employee is a member; and
- identifying one of the SaaS applications used by the identified management group and displaying the identified SaaS applications in a user interface rendered by the client device as recommended applications for the given client employee.

The solution proposed by the prior art application WO2024118245 makes it possible to partially automate the management of SaaS in an organization with a large number of users but has the disadvantage of being very rigid and restrictive for users who are limited to the SaaS provided for the group of people to which they hierarchically belong, and a priori prevents any transgression.

BRIEF SUMMARY

In order to overcome these drawbacks, the present disclosure relates to a method for managing software used on a plurality of computer terminals (computer workstations, mobiles, tablets) used by a community of users belonging to an entity applying security policies, each of the computer terminals comprise a means of authenticating the user, characterized in that it comprises the following steps:

- installation on each of the computer terminals of a data collection module configured to monitor in real-time, user interactions with a plurality of applications;
- recording of references for the use of the applications;
- data collection, including the capture of application usage data, including identification of the applications in use;
- analysis of the data collected for:
  - carrying out real-time identification of the applications used by each user,
  - detecting anomalies relating to benchmarks of application usage,
- generation of real-time notifications according to application usage, configured to send personalized electronic messages to the computer workstations (through an internet browser or desktop) or user mobile devices and tablets; the notification is triggered in the event of abnormal behavior or to optimize the use of applications.

According to the variants:

The data includes at least part of the events consisting of click metrics, duration of sessions, data entries, and interactions with specific functionalities of SaaS applications.

The method comprises a preliminary step of configuring a data lake to store the data collected on the computer terminals.

Data stored in the data lake is encrypted at rest and in transit to ensure the security and confidentiality of the information collected.

The data collection module, a means for data analysis, is an API.

The collected data analysis step is performed by an analysis engine that executes processing for:

- performing behavioral analyses on the usage of the SaaS applications by the users,
- identifying redundant or underutilized applications,
- detecting anomalies in the use of the SaaS applications, and
- comparing the performance of SaaS applications to external benchmarks;

The data analysis engine is configured to run machine learning algorithms to identify usage patterns, unusual user behaviors, or vulnerabilities in the SaaS applications.

The data analysis engine is configured to perform comparative analyses between the performance of similar SaaS applications used in the enterprise and in other organizations, in order to provide industry benchmarks.

The data collected on the computer terminals are recorded in a data lake.

The data lake is configured to organize data into multiple areas, including:

- an area for the raw storage of collected data,
- an area for storing data after cleaning and transformation,
- an area for storing data ready for analysis.

The notification system is configured to send contextual notifications based on predefined rules, such as prolonged usage of a SaaS application, a security policy violation, or insufficient adoption of a new application.

The data analysis engine is configured to perform comparative analyses between the performance of similar SaaS applications used in the enterprise and other organizations, in order to provide industry benchmarks.

BRIEF DESCRIPTION OF THE DRAWINGS

This present disclosure will be better understood upon reading the following description concerning a non-limiting example of an embodiment illustrated by the attached drawings in which.

DETAILED DESCRIPTION

Figure 1:
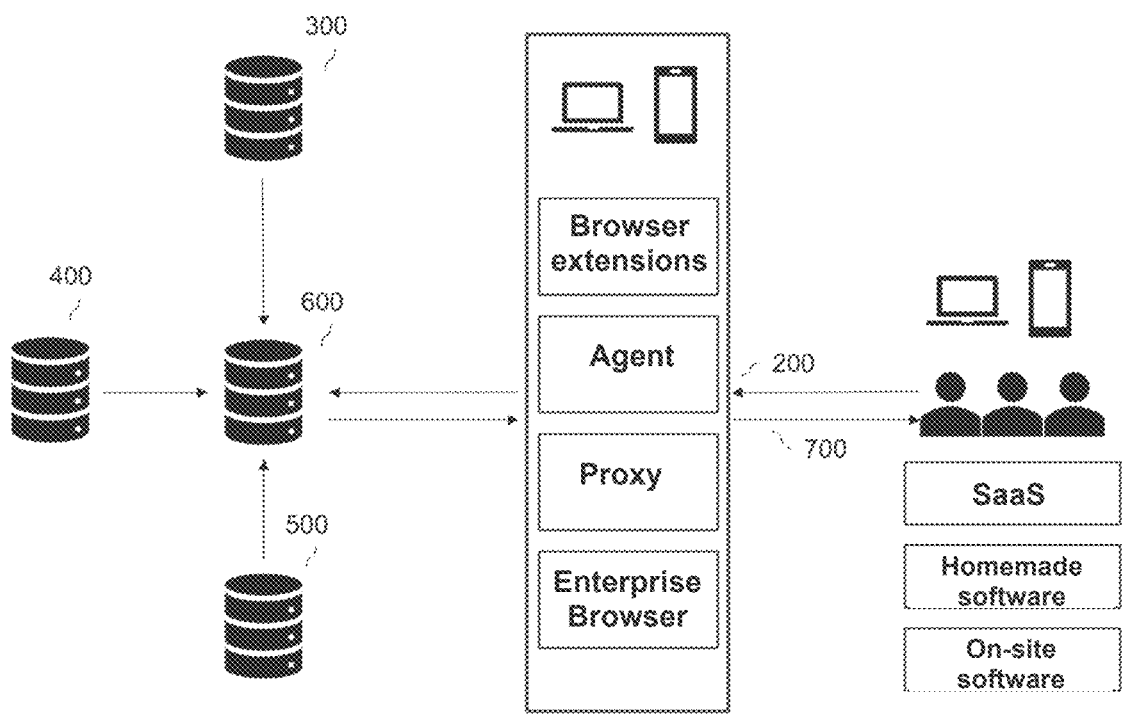
FIG. 1 shows a holistic diagram of an exemplary embodiment of the present disclosure.
Figure 2:
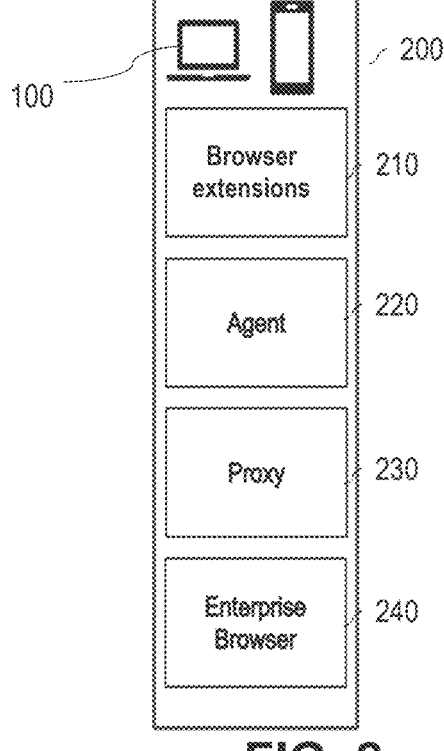
FIG. 2 shows a functional diagram of the user data collection modules installed on each user's terminal.

The subject matter of the present disclosure is:

- automatic identification, in an exhaustive manner, of uses on software (SaaS, homemade, on-site software);

automatic categorization of applications by functional area (e.g., Sales, Marketing, AI) on different levels (1000+ features covered);

automation of the definition of company policies on applications in the same grouping: standard, tolerated, prohibited; and automation of real-time notifications sent to employees to communicate company policies and redirect usage to standard applications lies in the automation of centralized, secure and optimized management of applications, including software installed on the terminal, in-house software running from the cloud, and/or SaaS (Software-as-a-Service) applications within a company, by automatically identifying redundant or underutilized applications, and comparing actual usage of solutions with expectations, to redirect usage to a restricted subset of applications, according to company policies.

As used herein, the term "application management" means the conditional modification of the display of the page on which the application is used so as to cause partial masking, requiring the user to become aware of information related to the nature of the application; this allows for flexible and gentle compliance with IT security governance without abruptly blocking the use of the application.

As used herein, the term "computer terminal" means computer equipment enabling the execution of a software application, in particular a browser, in particular a computer, a tablet, or a "smartphone."

Management according to the disclosure is carried out in particular by:

comprehensively identifying software uses (SaaS, home-made on-site software);

differentiating between simple "showcase" visits and proven uses of applications, thanks to algorithms taking into account different data points, in particular allowing us to understand the typology of the page visited and user behavior;

automatic categorization of applications by functional area (e.g., Sales, Marketing, AI) on different levels (1000+ functionalities covered);

automatically defining company policies on applications in the same group: standard, tolerated, prohibited; and real-time notifications sent through the active tab of the application usage to employees to communicate company policies and redirect their usage to the company's standard applications.

In the following description, we consider more particularly SaaS applications, without, however, limiting the disclosure to the management of SaaS applications.

Of course, the disclosure also applies to applications installed on the user's terminal and to applications executed from the cloud.

The disclosure provides a technical solution that allows better control of the SaaS ecosystem of the company, with a focus on operational efficiency, risk reduction, and continuous improvement of the user experience and governance, without blocking users a priori in the use of SaaS and by automating the exchange of messages to encourage users to harmonize SaaS within the company, with discernment, and to collect relevant information likely to deviate from absolute harmonization automatically.

According to a non-limiting implementation, the method of managing software as a service used on a plurality of computer terminals, each comprising a browser including a means of authenticating the user, according to the present disclosure, comprises the following steps:

installation of a data collection module on each of the computer terminals configured to monitor in real-time, user interactions with a plurality of Saas applications;

the data collection includes the capture of application usage data, and the identification of the Saas used;

execute a means for data analysis, configured to record usage references of the identified SaaS applications and to process the collected data in order to:

perform analyses of the identifier of the SaaS application(s) by users, and detect anomalies in the use of SaaS applications relating to benchmarks, generate notifications in real-time and at the point of use, configured to send personalized electronic messages to the users' computer terminals based on the results of the analyses; the notification is triggered in the event of abnormal behavior or to optimize the use of the applications; and ensure that the notified message obstructs a portion of the screen where the user's usage is located without, however, preventing or blocking this usage during the overlay of the masking screen. The goal is to encourage people to read the message, interact with the notification, or potentially make it disappear following a set of user actions. For this purpose, the browser extension determines the active tab of the application in question and generates a message displayed in an area defined in the same active tab, graphically superimposing the display window of this application in question in a persistent manner, without the possibility for the user to suppress this display other than by planned actions.

Description of an Example of Hardware Architecture

The hardware architecture of the disclosure is based on the management and analysis of large-scale SaaS applications. It involves a distributed and scalable cloud infrastructure. This architecture must meet performance, security, availability, and scalability requirements. The main hardware components and their organization are a cloud infrastructure. The computing resources specific to the disclosure are hosted on a cloud infrastructure.

The computing resources include several calculation servers:

One or more application servers (10): these are the servers that host the business code of the present disclosure. They perform data analysis algorithms, user management, business logic, etc. These servers can be organized as microservices to improve the modularity, flexibility, and resilience of the system.

One or more API servers (20): APIs provide interfaces between managed SaaS applications and the backend software layer accessing data, allowing interaction with databases, collection of data on the applications used, and coordination of real-time notifications. A single piece of computer equipment can act as both an application server and an API server.

One or more intensive computing servers (30) to execute complex supervised machine learning or deep learning algorithms or even Large Language Models to analyze user data; servers equipped with GPUs (graphics processing units) can be used to accelerate the processing.

Data storage is provided by one or more data lakes to store the massive volumes of data collected on the use of SaaS applications (user behavior, security, compliance, etc.). Data lakes are distributed storage systems that can handle large amounts of structured and unstructured data.

Data storage also uses NoSQL™ and SQL™ databases. Data that needs to be stored in a structured format, such as information about users, roles, permissions, and configurations, can be managed through relational databases like PostgreSQL™ or MySQL™. For higher volumes of unstructured data (logs, events), NoSQL™ databases like MongoDB™ or Cassandra™ can be used.

The hardware architecture also includes one or more backup services. To ensure data resilience and availability, distributed and geo-replicated backup services are implemented. They ensure that data is always available even in the event of hardware failure or disaster.

The network includes load balancers (50) set up to distribute user requests across multiple servers and ensure availability and rapid response of services. This helps avoid overloads on a single server by intelligently distributing traffic. It also usually includes one or more networks (Virtual Private Networks (VPNs)) and firewalls to ensure the security of client companies' data. This includes solutions like VPNs to isolate sensitive network segments, as well as firewalls and intrusion detection systems to filter malicious traffic.

Local data collection and analysis is provided by browser extensions installed on each of the users' computer terminals. They provide the ability to collect data in real-time via browser extensions. These extensions send user behavior data (click metrics, time spent, data entry, etc.) to the backend software layer, requiring low latency and data encryption for security reasons.

Click metrics refer to quantitative data measuring the number and behavior of clicks made by users on a digital interface. These metrics may include indicators such as:

Total clicks: the total number of clicks recorded over a given period.

Click-through rate (CTR): the ratio between the number of clicks and the number of prints or views of an interactive element.

Unique clicks: the number of unique visitors who clicked on an item.

Clicks by source: the distribution of clicks across different traffic sources (e.g., organic search, social media, emails).

These metrics help analyze user engagement and the effectiveness of user interfaces.

This data is collected through real-time tracking services that require low-latency servers to analyze and respond to user events.

One or more notification servers (60) send notifications to users via their browsers at specific times, for example, after 15 minutes of use or in the event of abnormal behavior. This requires push notification servers capable of interacting with users in real-time.

The architecture also includes interactive dashboards (70) that aggregate data and enable real-time reporting. These dashboards are hosted on dedicated web servers and use technologies to provide a smooth user interface.

Functional Architecture

The functional architecture of the present disclosure can be described as a set of interconnected components and services, each playing a specific role in providing optimized management of SaaS applications within an enterprise. This architecture is based on modules dedicated to collection, analysis, security, governance, and user interaction. This functional architecture includes:

1. A Module (200) for Collecting User Data (Tracking and Monitoring)

This data collection module (200) is responsible for capturing user interactions with SaaS applications used in the enterprise. It is installed on the computer terminal and configured to monitor user interactions in real-time with a plurality of SaaS applications. This data collection module (200) consists of several sub-components, depending on the nature of the applications:

Browser extensions (210): These extensions, installed on users' browsers, record interactions such as clicks, session times, data entries, and other behaviors. Browser extensions monitor and control online activities, especially access to SaaS applications, directly within the browser.

An agent (220) constituted by an event collection API. This agent software is installed on each user's device, monitoring activities in real-time, including SaaS application use. Data captured by the extensions is transmitted to a central API in real-time, which aggregates it for further processing.

An intermediate proxy (230) acts as an intermediary between the user and the Internet, intercepting and controlling web traffic to filter, analyze, and block access to certain resources.

A secure Enterprise Browser (240) that combines the classic features of a web browser (such as Chrome, Edge, or Firefox) with advanced security, management, and governance tools tailored to business needs. Unlike traditional browsers, Enterprise Browsers natively integrate control and data protection mechanisms for work environments.

2. SaaS Knowledge Base

This data collection module (200) is responsible for maintaining a common taxonomy of SaaS applications, in order to facilitate the management and analysis of solutions deployed in the enterprise. This database (300) contains detailed information on more than 40,000 SaaS:

Application catalog, of the "ID (application identifier) type I URL| application name I functional area I status (allowed or forbidden) I Message to send (for forbidden applications) I Substitution target application ID (for forbidden applications)." This comprehensive catalog of applications with metadata (publisher, category, security level, compliance, etc.) makes it possible to compare and filter solutions according to business needs.

Identification of redundancies and usages: This sub-component analyzes the collected data and identifies redundant or underused applications in the company's software portfolio. This enables managers to streamline the tools they use.

3. a Data Lake and a Data Analysis Engine.

The data lake stores all data generated by users and observed SaaS applications. It forms the central foundation for analyzing usage:

User and SaaS data storage: All data collected by the tracking module (sessions, clicks, etc.) and application information are stored in a high-capacity and scalable Data Lake.

Data Analysis Engine: this engine allows you to process large volumes of data by performing behavioral analyses. It uses machine learning and advanced analytics techniques to detect usage patterns, trends, and potential risks (e.g., SaaS applications that do not comply with security standards).

Inter-enterprise comparison: comparing SaaS usage across millions of users and thousands of applications across different industries provides benchmarks for companies to assess their effectiveness.

4. Security and Compliance Module

This module ensures that the SaaS applications used comply with the company's internal security and compliance standards and external regulations (e.g., GDPR):

Verification of SaaS compliance:

The module analyzes each application to verify whether it complies with internal policies and regulatory standards (e.g., data security, encryption, access management).

Risky Behavior Detection: Users can be monitored in real-time to detect unusual behavior, such as using unauthorized apps or sharing sensitive data. This component triggers alerts when risks are detected.

5. User Notification and Interaction System (Real-Time Engagement):

This system is responsible for sending notifications or contextual messages to users in order to improve tool adoption and ensure usage compliance:

Sending personalized messages: The system identifies the ideal time to send notifications (in real-time, after a certain period of inactivity, etc.) and to the right users (e.g., experienced or novice users).

Real-time guidance: Recommendations can be sent to users to improve their productivity, help them use tools effectively, or alert them when suspicious behavior is detected.

Figure 3:
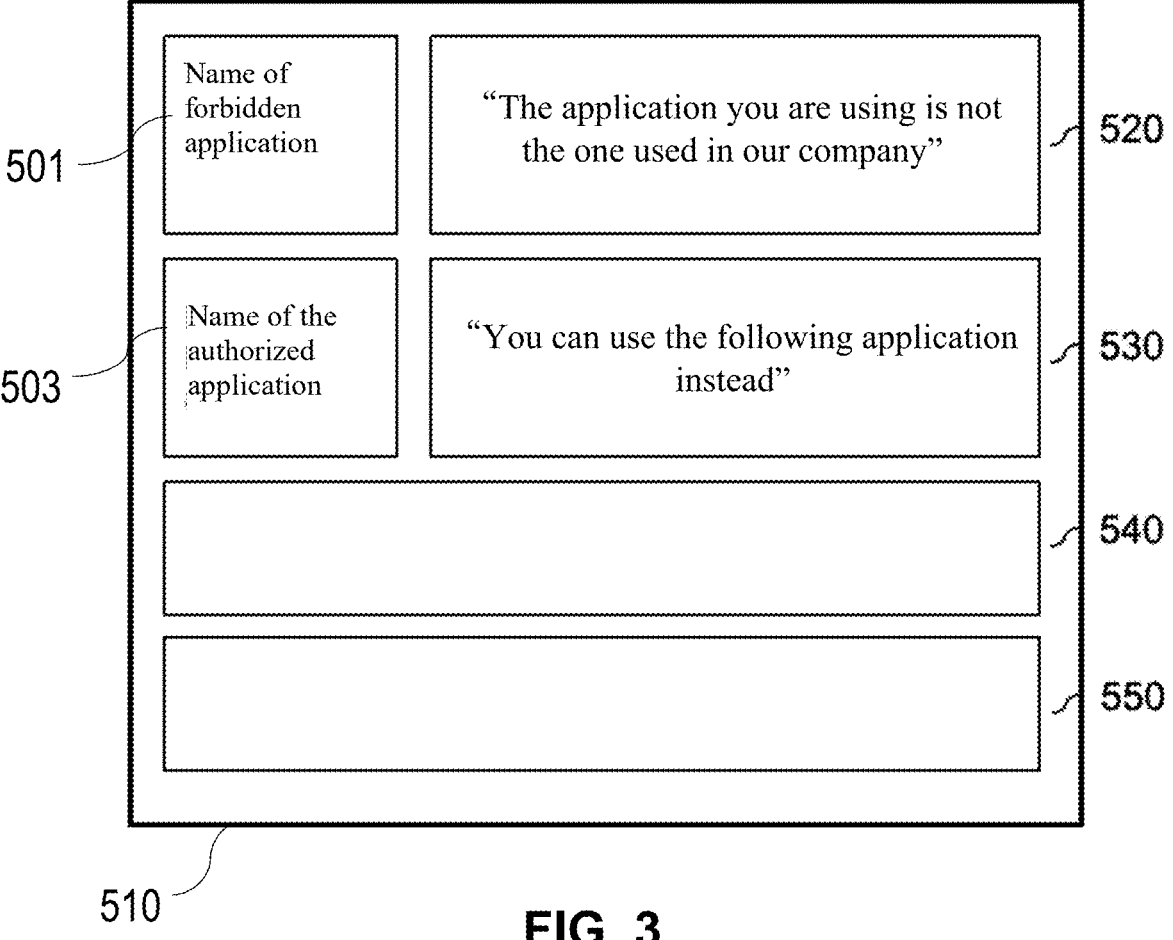
FIG. 3 shows a schematic view of a digital real-time notification message.

The digital messages (500) have a structure illustrated in FIG. 3.

They include a notification window (510), the name of the prohibited application (501) associated with a text message (520), for example, "The application you are using is not the one used in our company," the name of the substitute application (503), associated with a text message (530), for example, "You can use the following application instead."

These messages (500) include real-time observation fields of an anomaly in a notification window (510), a button (540) for redirecting to the authorized application, and an explanatory text (550) to raise employee awareness of company policies.

6. Governance and Reporting Module:

This module provides the tools for the strategic management of SaaS applications across the different departments of the company (IT, purchasing, finance, business). It centralizes governance and facilitates decision-making:

integration of additional data;

organizational data (Active Directory);

"Business Capability Map" from architecture tools such as LeanIX;

Security data (e.g., application upload and download volumes) from security tools such as Zscaler;

License and Cost Management: The module tracks SaaS license spending and identifies cost reduction opportunities by eliminating redundant or unused applications;

Alignment with business objectives: It helps ensure that the SaaS applications used meet the company's strategic objectives in terms of digital transformation, innovation, and cost optimization; and Dashboards: Decision-makers have access to dynamic dashboards that aggregate key data on the SaaS application usage, compliance, security, and user performance. These tools facilitate decision-making and collaboration between departments (IT, business, purchasing, finance).

The functional architecture is divided into several modules that interact to collect, analyze, secure, and manage a company's SaaS applications. It is based on seamless integration between different departments of the company and offers centralized data management and governance while ensuring security and compliance.

Detailed Description of the Collection Module

The user data collection module plays a vital role in the solution architecture as it captures, processes, and transmits user interactions with the SaaS applications in real-time. This module is designed to provide fine-grained visibility into the use of SaaS tools within a company and is designed to be lightweight, secure, and scalable.

The data collection module consists of several interconnected functional subcomponents that provide real-time monitoring of user activities in the SaaS applications via browsers or other interfaces:

a) Browser Extension: The browser extension is installed on users' computers and functions as a local agent that collects information about the usage of SaaS applications accessible through the browser. Developed, for example, in JavaScript, this extension works independently of the operating system, which allows compatibility with the main browsers (Chrome, Firefox, Edge, etc.). The main functionalities are the following:

Capturing user events: The extension monitors interactions such as clicks, text input, session duration, page visited (e.g., footer size, number of links in the footer, presence of login/logout buttons, lexical field on connections, login action via login URL).

Session Tracking: It identifies user sessions by associating a unique identifier with users and tracking their activity throughout the duration of application usage.

Data Transfer Mechanism: Collected events are transmitted to a backend API in real-time via secure HTTP requests.

b) An event collection API is responsible for receiving data sent by extensions and pre-processing it before it is stored or sent for analysis. For example, it is built using robust web technologies such as Node.js or Python (Flask/Django) to handle high-frequency requests efficiently. These main functionalities are the following:

Data Reception: Data is sent in JSON packets or via WebSockets, and the API ensures it is received correctly.

Data Validation: The API performs an initial data validation to check format conformity, user session validity, and the integrity of transmitted data.

Event Normalization: Before moving on to processing, events are normalized to make them easier to analyze. For example, clicks or entries are translated into pre-formatted actions that can be processed by downstream analysis engines.

Secure Transmission: All communications between extensions and the API are encrypted via secure protocols like TLS/SSL to ensure data confidentiality.

c) A user session management system helps identify and track user actions over time by linking collected events to specific user sessions. These main functionalities are the following:

User ID Management: When a user logs into a SaaS application, they are assigned a unique ID that tracks their interactions over time without revealing their personal identity.

Session Analysis: Sessions are analyzed to identify durations of use, breaks, resumption of activity, etc.

Cross-device Recognition: If a user accesses SaaS applications from different devices, the system can merge the associated events for a complete view.

d) A queuing and event processing system ensures a smooth and efficient collection of user events and prevents server overload by distributing the load. Message queue systems like Apache Kafka or RabbitMQ can be used to handle incoming event streams. The functionalities are the following:

Event Queuing: Events collected via the API are placed in a queue before being sent to the analytics engine. This helps manage traffic spikes without affecting performance.

Asynchronous Processing: Events are processed asynchronously, which means they can be recorded and analyzed in delayed time without disrupting the user experience.

e) The data lake and real-time analysis engine are designed to store and analyze the events collected to gain insights into the use of SaaS applications. The data lake often relies on storage systems like Amazon S3, Azure Blob Storage, or Google Cloud Storage, while real-time analytics can be done through tools like Apache Spark or Flink.

Every user event is recorded in the data lake, enabling historical and comparative analysis. The behavioral analysis engine performs real-time analysis to identify specific patterns (e.g., long sessions, inactive users, experienced users). Data is scanned for unusual or risky behavior, such as unauthorized access to certain SaaS applications.

The above presentation is about managing applications running in the cloud (SaaS or internal software) on users' computers. For other thick client type applications installed on the work terminal, the collection of this data would be carried out by an agent installed on the employees' work terminal. For use on users' mobiles or tablets, the collection of this data would be carried out by the native functionalities of the OS (This functionality makes it possible to measure the time spent on each application installed on the mobile and on the websites visited via the main browser).

Data Flow and Operation

The operation of the data collection module can be broken down into several steps, from user interaction to data analysis:

Step 1: Monitoring and Capturing Events. The user interacts with a SaaS application through their browser. The extension captures events such as clicks, mouse movements, data entries, page changes, errors, etc.

Step 2: Data Transmission. Collected events are immediately transmitted via HTTP POST or WebSocket calls to the collection API, which receives them, validates them, and structures them for further use.

Step 3: Session Management and Preprocessing. The API associates each event with a unique user session, validating that the user is authorized to access that SaaS application and applying security rules to ensure that events are correct and not manipulated.

Step 4: Queuing Events. Validated events are placed in a queue managed by a message queue system (Kafka or RabbitMQ). This makes it possible for events to be distributed across multiple processing processes and avoids overloads.

Step 5: Storage and Analysis. Once preprocessed, events are sent to the data lake for long-term storage. At the same time, real-time events are analyzed by algorithms to detect user behavior patterns or security anomalies.

Step 6: Feedback and Notification. If abnormal behavior or inefficiency is detected (for example, a user fails to use an application optimally), the system can trigger a real-time notification to the user or administrator to correct the problem.

SaaS Knowledge Base

The SaaS Knowledge Base is a key component that helps centralize, structure, and organize information about thousands of SaaS applications used in an enterprise. This database is essential to enable efficient application management, facilitating the identification of redundancies, compliance with standards, and optimization of application usage. The goal of this database is to provide a complete and structured taxonomy of the SaaS applications, including metadata on each application (publisher, type, security, compliance, usage, etc.), in order to enable companies to manage their software ecosystem better.

The architecture is built around several layers and logical components, each with a specific role in the organization, collection, storage, and processing of data on SaaS applications.

The knowledge base is based on a hierarchical taxonomy that classifies SaaS applications according to several criteria. This taxonomy makes it possible to group applications by categories, understand their redundancies, and evaluate their relevance.

Basic categories: Application type (collaboration, finance, marketing, etc.).

Security Levels: Classification of applications according to their security level (encryption, authentication, compliance with standards).

Compatibility with standards: Assessment of application compliance with regulatory standards (GDPR, SOC 2, ISO 27001, etc.).

Each application is described by a series of attributes, which go beyond simple classification and that make it possible for a more detailed evaluation to be made.

Application name and publisher.

License Type (free, freemium, paid).

Security (type of authentication, encryption, compliance with security standards).

Legal compliance (e.g., GDPR, HIPAA).

Compatibility with other systems (API integrations, connectors).

Popularity or usage in the company (number of users, frequency of use).

Redundancy: identification of similar functionality with other SaaS applications.

Information about the SaaS applications comes from several sources:

Direct Integrations: the API connects directly to SaaS services to collect metadata.

User contributions: Administrators and IT teams can enrich the database with data specific to their company or their own experiences on the use of applications.

Third-party providers: Integration of external services that provide information on security standards or legal compliance of applications (e.g., sources like Trust-Arc™ or SecurityScorecard™).

Automatic enrichment process to augment the collected information with external data, such as user reviews, security updates, or privacy policy changes.

Once the information is collected, it is indexed in the knowledge base to enable quick and efficient searching. Each application is associated with one or more indexes depending on its characteristics (type, publisher, compliance, etc.). The knowledge base search engine allows users to filter and search for applications based on specific criteria (application type, compliance, etc.). It is based on full-text search and semantic search algorithms.

Each application is rated based on specific criteria such as security, compliance, business usage, or user feedback via a scoring algorithm to rank applications and help businesses choose the most appropriate ones.

Rating based on security practices (encryption, identity management, etc.).

Rating based on compliance with regulatory standards.

Assessment of ease of adoption by internal users within the company.

The present disclosure allows administrators to compare similar applications to identify duplicates, the most efficient solutions or those that better meet security and compliance requirements.

The SaaS knowledge base relies on a relational database to store well-structured information, such as application metadata, category relationships, and security standards. Technologies like PostgreSQL or MySQL can be used.

Tables and Relationships: The relational database is organized into tables (applications, publishers, categories, etc.) linked together by foreign keys to ensure the consistency of information.

NoSQL Database (MongoDB, Cassandra): A NoSQL database can be used in addition to storing less structured data such as usage event logs, user feedback, or evaluations based on real behaviors.

Usage log storage: Allows you to keep track of status changes, usage over time, or updates to SaaS applications.

The knowledge base is regularly updated to include new SaaS applications, security updates, or changes in compliance policies. These updates can come from the publishers themselves via APIs or information feeds. Enterprise customers can synchronize the knowledge base with their own internal SaaS databases to align information with standards and real-world usage in the enterprise.

The knowledge base is accessible through a web portal where administrators can view, search, and analyze information about SaaS applications. This portal is built with modern web frameworks like React™ or Angular™.

Data Analysis Engine: Architecture and Operation

The Data Analytics Engine is responsible for processing the data stored in the data lake. Its role is to run large-scale analyses, identify user behavior patterns, detect anomalies, and generate actionable reports for decision-makers.

The analytics engine relies on distributed data processing technologies to be able to process large volumes of data quickly and efficiently. The analytics engine can include machine learning algorithms (via Spark MLlib™) to detect patterns, such as security anomalies or SaaS application usage trends. For more advanced analytics, such as user segmentation or event prediction, deep learning frameworks can be integrated.

The analytics engine performs several types of analytics on the data collected in the data lake:

Behavioral Analytics: Analyzing user interactions with SaaS applications to understand usage patterns, such as session length, most frequently used applications, or deviant behaviors.

Benchmarking: comparing a company's SaaS application usage with industry benchmarks or other similar companies to assess the performance and adoption of tools.

Anomaly Detection: Using machine learning techniques, the analytics engine can identify abnormal or risky behaviors, such as unauthorized application usage, unusual traffic spikes, or security breaches.

Compliance and Security Analysis: The engine analyzes SaaS applications based on predefined security and compliance criteria. This helps identify applications that do not meet corporate security standards or are potentially vulnerable.

Data processing follows several key steps:

Data Ingestion: Data from the data lake is ingested by processing pipelines, which can be run in batch or real-time as needed.

Data Cleansing and Transformation: Before being analyzed, data is cleansed to remove errors or inconsistencies, and it is enriched with additional information from external sources (e.g., compliance or security updates).

Analysis and Computation: Analysis algorithms are run on the cleaned data to generate actionable insights. This may include descriptive analytics (past trends), predictive analytics (future predictions), or prescriptive analytics (action recommendations).

Results and Visualization: The results of the analyses are stored in intermediate databases (Data Warehouse or NoSQL databases) and presented to users via interactive dashboards or automated reports.

To orchestrate analysis tasks and ensure a smooth processing flow, workflow management tools can be used. These tools enable you to automate processes, schedule recurring analyses, and monitor analysis pipelines in real-time.

Description of an Example Implementation

When a user accesses an application on a work device (browser or non-browser), the extension, and/or local agent, and/or proxy capture usage data. The data is then sent to the knowledge base that identifies whether the application complies with company policies. In case of non-compliance, the system triggers a pop-up notification offering an authorized alternative.

At the same time, the analytics engine processes the collected data to identify redundant applications, calculate usage metrics, and detect abnormal behavior. If a SaaS application is underutilized or does not meet security standards, an alert is sent to administrators, who can then adjust licenses and configurations to optimize resources. The following description with reference to the accompanying drawings concerns the key elements of the present disclosure for centralized, secure and adaptable management of SaaS applications, reducing security risks, usage inefficiencies, and costs associated with underutilized licenses.

FIG. 1 describes the key components and their interaction to ensure optimized and secure management of SaaS applications, as well as compliance with corporate policies.

The first key component is the data collection module (200) installed on the computer terminal (100) of each of the users. This data collection module (200) includes a browser extension software component (210). Extensions (210) are installed on users' browsers (100) to monitor online activities, particularly access to SaaS applications. These extensions (210) record user events such as click metrics (pointer position, timestamp, duration . . . ), session duration, and specific interactions with each application.

Alternatively, the data collection module (200) can be implemented by a software agent (220) installed locally on each work terminal (100) to capture user interactions in real-time and compile data on the use of SaaS applications.

Another alternative embodiment of the data collection module (200) is to use an intermediate proxy (230) to filter and analyze web traffic to identify the applications accessed.

It blocks access to non-compliant applications or applies access restrictions according to defined policies.

A second key component of the present disclosure is the Applications knowledge base (300). This knowledge base (300) groups together all the SaaS applications known to the company, segmented by functional areas (such as videoconferencing, project management, and file sharing). It makes it possible to identify and classify standard, prohibited, and tolerated applications by functional domain.

Each application is associated with metadata, including URL, usage policy, and notification preferences, allowing the system to compare real-time usage with corporate standards.

The third key component of the present disclosure is a digital record of corporate policies for applications (400), associating with each application digital indicators for determining which applications are standard, tolerated, or prohibited. For example, if a video conferencing application is standard, it will be preferred, while others will be tolerated or blocked depending on the needs of the business.

The fourth key component of the present disclosure is the notification parameterization system (500). This notification parameterization system (500) is integrated to send contextual messages based on the usage of SaaS applications. If a user accesses an unauthorized app, a notification is triggered, redirecting the user to a standard app.

The notification can be configured to appear after a certain duration of usage or when abnormal behavior is detected. It includes redirection options, a message explaining the reasons for the restriction, and a link to the compliant application.

The fifth key component of the present disclosure is the data analysis engine (600), which centralizes the collected data to track application usage behaviors. Based on detection algorithms, the engine identifies redundant applications, underutilization, and security anomalies. It also compares usage data with internal and external benchmarks to optimize the company's SaaS configuration.

The sixth key component of the present disclosure is the Real-Time Notification Module (700). Based on the analysis results, the system sends real-time notifications to users or administrators. For example, if a user uses a prohibited app, a pop-up reminds them of the company policy and offers a redirect to a standard app.

Notifications are customizable and include clear messages to guide users in compliance with company policies. These notifications appear in the browser or on the work terminal as needed.

Technical Contribution of the Disclosure

The present disclosure seeks to automate in real-time and continuously the governance and adoption of SaaS applications by capturing in real-time application usage data, identifying redundancies and detecting anomalies, the present disclosure optimizes the use of computing resources and improves system security. This treatment enables more efficient distribution of the workload and proactive protection against deviant behavior, thus producing an additional technical effect in terms of security and performance.

The technical modules provided in the implementation of the process, such as browser extensions, collection API, analysis engine, and real-time notification servers, play a crucial technical role. These elements, integrated into the management architecture, are directly responsible for the collection and analysis in real-time of user interactions, making it possible to detect usage patterns that would be impossible to identify without an automated device. They provide a centralized and automated management system for SaaS applications, with proactive responses to security incidents. The method that is the subject of the present disclosure addresses several specific technical problems, in particular, the overload of computing resources due to redundant applications, the lack of visibility on the actual uses of SaaS, and the security risks linked to the use of non-validated applications. By providing an integrated solution that monitors, analyzes, and optimizes SaaS usage in real-time, the present disclosure provides an effective technical response to execution, security, and compliance issues, going beyond the standard capabilities of the SaaS software.

Furthermore, the combined architecture including data collection modules, an advanced analytics engine, and a notification system-contribute to the overall effect by enabling automated monitoring and optimized management of SaaS applications. These technical features are not limited to simple software execution but form an interconnected whole that produces a concrete technical effect: a more secure and optimized operation of SaaS resources in the company.

Furthermore, the steps of the present disclosure (capturing usage data in real-time, analyzing the data to identify deviant or inefficient behaviors, and notifying users accordingly) provide a specific technical solution to the challenges of managing SaaS in enterprise environments. These features go beyond traditional SaaS management methods, adding a capacity for adaptation and optimization of resources that is not obvious from the current state of the art.

What is claimed is:

1. A method for managing software used on a plurality of computer terminals used by a community of users belonging to an entity applying security policies, each of the computer terminals comprising a means of user authentication, the method comprising:

installing a data collection module on each of the computer terminals, the data collection module configured to monitor user interactions with a plurality of SaaS applications in real-time;

recording usage references of the plurality of SaaS applications in a knowledge base;

collecting data capturing application usage data, including identification of the plurality of SaaS applications used;

analyzing the collected data via a data analysis engine, the analyzing including:

identifying in real-time the plurality of SaaS applications used by each user, and detecting anomalies in relation to application usage references; and generating real-time notifications according to application usage, the notifications configured to send personalized electronic messages to the users' computer terminals, a real-time notification being triggered in an event of abnormal behavior or to optimize application usage, the real-time notification commanding masking of a part of a display area of a graphical interface corresponding to an application of the plurality of SaaS applications having caused the generation of the real-time notification;

wherein the data analysis engine is configured to execute processing for:

performing behavioral analyses on user usage of SaaS applications;

identifying redundant or underutilized applications;

detecting anomalies in the user usage of SaaS applications; and comparing the performance of SaaS applications to external benchmarks.

2. The method of claim 1, wherein the collected data comprises one or more of click metrics, session durations, data entries, and interactions with specific functionalities of the SaaS applications captured by browser extensions and a software agent.

3. The method of claim 1, further comprising configuring a data lake to store the collected data collected on the computer terminals.

4. The method of claim 3, wherein the collected data stored in the data lake is encrypted at rest and in transit to guarantee security and confidentiality of the collected data.

5. The method of claim 1, wherein the data collection module and the data analysis engine are part of an application programming interface (API).

6. The method of claim 1, wherein the data analysis engine is configured to execute a machine learning algorithm to identify usage patterns, unusual user behaviors, or vulnerabilities in SaaS applications.

7. The method of claim 6, wherein the data analysis engine is configured to perform comparative analyses between performances of similar SaaS applications used in a company and in other organizations.

8. The method of claim 1, wherein the data analysis engine is configured to perform comparative analyses between performances of similar SaaS applications used in a company and in other organizations.

9. The method of claim 1, further comprising storing the collected data in a data lake.

10. The method of claim 9, wherein the data lake is configured to organize the collected data into:

an area for raw storage of collected data, an area for storing data after cleaning and transformation, and an area for storing data ready for analysis.

11. The method of claim 1, wherein the generating real-time notifications according to application usage is performed by a notification system configured to send contextual notifications according to predefined rules.

12. A method for managing software used on a plurality of computer terminals used by a community of users belonging to an entity applying security policies, each of the computer terminals comprising a means of user authentication, the method comprising:

installing a data collection module on each of the computer terminals, the data collection module configured to monitor user interactions with a plurality of SaaS applications in real-time;

recording usage references of the plurality of SaaS applications in a knowledge base;

collecting data capturing application usage data, including identification of the plurality of SaaS applications used;

storing the collected data in a data lake, wherein the data lake is configured to organize the collected data into:

an area for raw storage of collected data, an area for storing data after cleaning and transformation, and an area for storing data ready for analysis;

analyzing the collected data via a data analysis engine, the analyzing including:

identifying in real-time the plurality of SaaS applications used by each user, and detecting anomalies in relation to application usage references; and generating real-time notifications according to application usage, the notifications configured to send personalized electronic messages to the users' computer terminals, a real-time notification being triggered in an event of abnormal behavior or to optimize application usage, the real-time notification commanding masking of a part of a display area of a graphical interface corresponding to an application of the plurality of SaaS applications having caused the generation of the real-time notification.

\* \* \* \* \*